July 10, 1923. 1,461,251

P. McLAREN

AUTOMOBILE SIGNAL

Filed May 23, 1921

INVENTOR:
PETER McLAREN,
BY
Graham + [illegible]
ATTORNEYS.

Patented July 10, 1923.

1,461,251

UNITED STATES PATENT OFFICE.

PETER McLAREN, OF WHITTIER, CALIFORNIA.

AUTOMOBILE SIGNAL.

Application filed May 23, 1921. Serial No. 471,773.

*To all whom it may concern:*

Be it known that I, PETER McLAREN, a citizen of the United States, residing at Whittier, in the county of Los Angeles and State of California, have invented a new and useful Automobile Signal, of which the following is a specification.

This invention relates to signaling devices for use on automobiles to indicate to drivers of following machines the intended movement of the machine equipped with such a device.

It is an object of this invention to provide a device of this type comprising a pair of electrically operated signals which may be mounted upon the fenders of an automobile, and which will have connected therewith means for operating either of the signals separately to indicate an intended change in the direction of travel of the car or for operating both of the signals simultaneously to indicate an intended stop.

It is a further object of this invention to provide a signal whch is operated in connection with the pedal controls of the automobile on which it is used, thereby leaving the hands free to operate the levers coming under their scope of operation.

It is also a further object to provide a signal device which will be automatically operated when it is required to suddenly retard the motion of the machine or to bring same to a quick stop due to the appearance of some unforeseen obstruction of the traffic.

Other objects and advantages will become evident throughout the following specification.

Referring to the drawing which is for illustrative purposes only:

Figure 1:
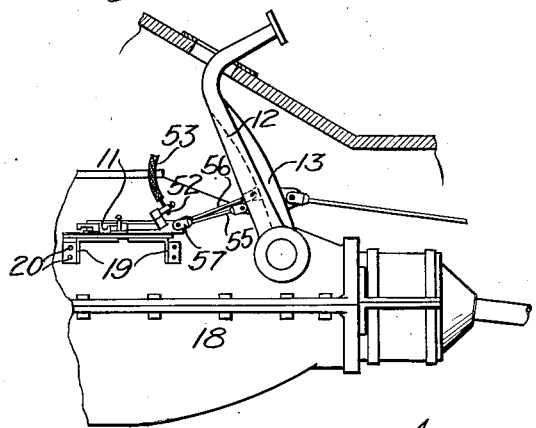
Fig. 1 is a fragmentary sectional view through that portion of an automobile in which the control pedals are located, illustrating the manner in which the novel switch which I employ is connected to and operated through the control pedals.

The device which I have invented comprises essentially of a switch 11 which is operated through the medium of the control pedals 12 and 13, and which switch makes electrical connection with the signals 14 and 15 upon the operation of the respective pedals. The switch 11 may be suitably mounted, as shown in Fig. 1 of the drawing, upon the transmission case 18 by the use of angle clips 19 secured to the case 18 by machine screws 20. This switch 11 has slide bars 25 and 26 which are slidably mounted by a base 27 and which have attached to the sides thereof contact plates 28 and 29; the plate 28 being adapted to make electrical contact with brushes 30 and 31, and the plate 29 being adapted to make electrical contact with brushes 32 and 33. The slide bars 25 and 26 are preferably made of some insulating material such as sheet fiber, and have suitably attached to their bottoms plates 35 which extend beyond the sides of the bars to form flanges therefor. A center plate 36 and side plates 37 are attached to the base 27 which is also made of an insulating material, and are held spaced away therefrom by strips 39 and 40. The plates 36 and 37 extend over the flanges formed by the plates 35 and form a means of keeping the slide bars 25 and 26 in their proper operating positions.

The brushes 30, 31, 32 and 33 are formed integrally from sheet metal and are provided with base portions 45 by which they are screwed to insulating plates 46 mounted upon the metal plates 37. The forward brushes 30 and 32 are provided with binding posts 49 and 50 mounted upon their respective bases 45, from which binding posts the external connections with the signals 14 and 15 are made.

The contact plates 28 and 29 are provided with binding posts 51 and 52 to which the battery connections are made by means of flexible conductors 53 as indicated in Fig. 1. The slide bars 25 and 26 are operated through the medium of the control pedals 12 and 13, the motion of the pedals being transferred to the slide bars through rods extending from lugs suitably formed upon the control pedals and connected to the slide bars by clevises 57 and 58.

The signals 14 and 15 are identical in construction and consist each of a body 60 provided with light receptacles 61 and 62 in which are located incandescent globes 63. Within the body 60 are slides 65 in which a target 67 operates. A solenoid 70 mounted within the body 60 provides an operating means for the target 67 through the movement of its core 71 which has connection to the target through a lever 75 and toggle links 76 and 77.

In the present construction of automobiles there is an amount of clearance in the coacting parts which comprise the different control systems which varies with the different makes of automobiles. When either the clutch pedal or the brake pedal is advanced, a portion of the advance is consumed in taking up the clearance existing between the different parts thereof before either the clutch is acted upon to be withdrawn from engagement or the brake band brought into frictional engagement with the brake drum. In the operation of my signaling device I utilize this ineffectual movement of the control pedals in operating the signals independently or simultaneously as will hereinafter be described.

Figure 2:
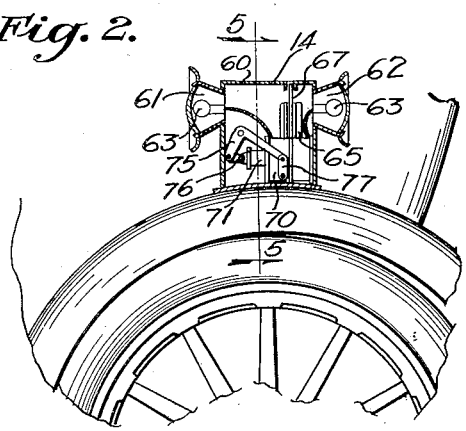
Fig. 2 is a fragmentary view of the rearward portion of an automobile showing one of the signals I employ mounted on the fender thereof.
Figure 5:
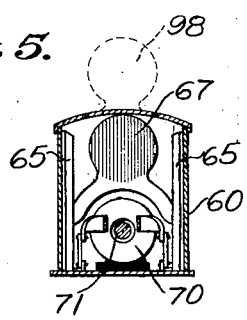
Fig. 5 is a vertical cross sectional view through one of the signals on a plane represented by the line 5—5 of Fig. 2.

When the driver desires to indicate his intention of turning to the left, the left hand pedal is advanced a slight distance. The advance movement thereof causes also a partial advance in the position of the slide bar 25 owing to the pedal 12 and the slide bar 25 being connected by the link 55. In being thereupon advanced in the direction indicated by the arrow 80 in Fig. 3 the slide bar 25 is brought into a position which will cause the brush 32 to rest upon the contact plate 29 and the signal 14 will be energized through the closing of a circuit formed by the lead 85, a branch 86 which makes connection with the binding post 52 of the contact plate 29, a conductor 87 leading from the binding post 50 of the brush 32 to the parts of the signal susceptible to energization, a conductor 88, and a conductor 89 in which is located a switch 90 and which forms a return to the battery 91. When the circuit is thus closed, current flows through both the lamps 63 and the winding of the solenoid 70 and causes the lamps to become lighted and the solenoid to attract the core 71 and to withdraw same from the position in which it is shown in Fig. 2, thereby lifting the target 67 and exposing same as indicated by the dotted line portion 98 of Fig. 5.

Likewise an intended turn to the right is made known to the drivers of following cars by similarly advancing the right hand pedal 13 and thereby causing the advance of the slide bar 26 by virture of their being connected by the link 56. The contact plate is then brought into contact with the brush 30 closing the circuit formed through the lead 85, a branch 92 which connects to the binding post of the contact plate 28, a conductor 93 connecting between the binding post 59 of the brush 30 and the elements of the signal 15, a conductor 94, and the conductor 89 which returns to the battery 91 as hereinbefore mentioned. The signal 15 is then energized and the target thereof brought into view and the lights thereof lighted.

An intended stop is indicated by displaying both signals at the same time and is accomplished by slightly advancing both pedals simultaneously, and is also automatically accomplished by advancing either of the pedals sufficiently to operate the parts with which they are associated, such as applying the brake while the clutch is left engaged to momentarily retard the motion of the machine, or the throwing out of the clutch by advancing the clutch pedal when it is required to come to a complete stop.

Figure 3:
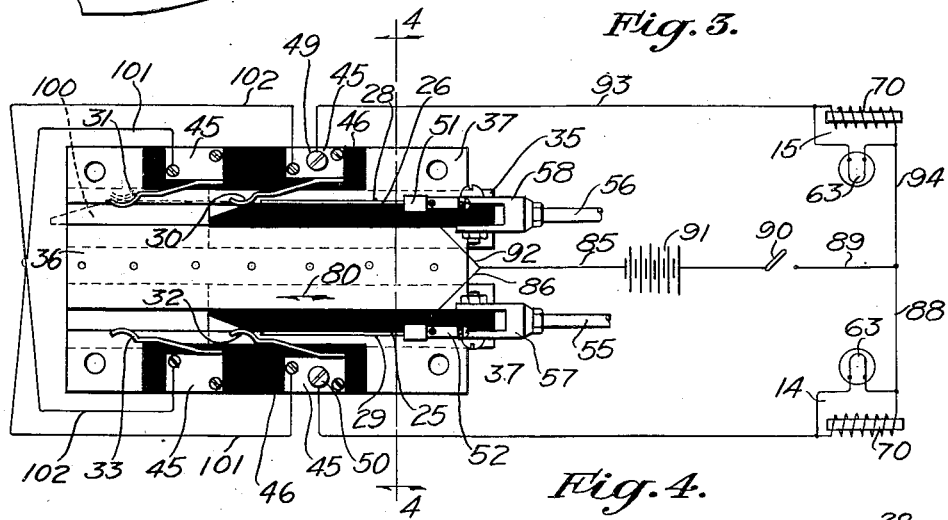
Fig. 3 is a plan view of the switch shown in Fig. 1, in whch the electrical connections thereto are indicated diagrammatically.
Figure 4:
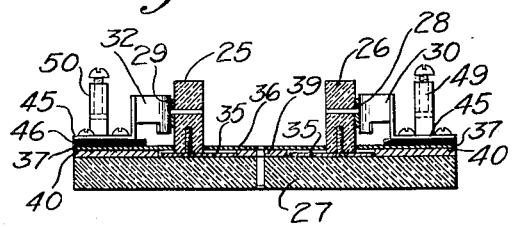
Fig. 4 is a view of a section through the switch and is taken on a plane represented by the line 4—4 of Fig. 3.

When the pedal 13, which is generally the brake pedal, is advanced sufficiently to cause the brake to frictionally engage, the slide bar 26 is moved forward into the position indicated by the dotted lines 100 in Fig. 3. In this position both the brush 30 and the brush 31 rest upon the contact plate 26 with the result that the signal 15 is energized through the circuit closed by the brush 30 coming into contact with the plate 28 as before mentioned, and the signal 14 is energized by a flow of current through the brush 31 and the cross connection 101 which provides a conductor between the brush 31 and the plate 45 mounting the binding post 50 which is in circuit with the signal 14. A like energization of both the signal 14 and the signal 15 is accomplished when the pedal 12 which is generally the clutch pedal, is advanced sufficiently to disengage the clutch, as the contact plate 29 will then be in a position to cause the closing of two separate circuits, having therein the signals 14 and 15, through the brushes 32 and 33, the brush 33 being connected with the plate 45 mounting the binding post 49, by a cross connection 102.

It will be perceived from the foregoing description that the operation of my signaling device is accomplished entirely by the feet of the driver and without the necessity of shifting the feet from the position required thereby to operate the control pedals. Also with the use of my device the hands are left free to perform the very necessary functions which are apportioned thereto in the driving of an automobile.

My invention lies chiefly in the development of the idea of operating a single signal by partially advancing either the clutch or the brake pedal, and the operating of both signals by advancing either of these pedals sufficiently to actuate the parts which they control.

I claim as my invention:

1. In a signaling device the combination of: a suitable number of electrically operated signals; levers adapted to actuate certain mechanisms; switch means associated with one of said levers to close an electric circuit including certain of said signals when said lever is partially advanced, said switch means to close a circuit including all of said signals when said lever is advanced sufficiently to actuate said mechanism associated therewith; and switch means associated with another of said levers to close a circuit including another of said signals when said secondly named lever is partially advanced, said secondly named switch means to close a circuit including all of said signals when said secondly named lever is advanced sufficiently to actuate said mechanism associated therewith.

2. In a signaling device, the combination of: a pair of electrically operated signals; a clutch actuating lever; a brake actuating lever; switch means associated with said clutch actuating lever to close an electric circuit including one of said signals when said clutch actuating lever is partially advanced, and to close a circuit including both of said signals when said clutch lever is advanced sufficiently to actuate said clutch; and switch means associated with said brake actuating lever to close an electric circuit including the other of said signals when said brake actuating lever is partially advanced, and to close a circuit including both of said signals when said brake lever is advanced sufficiently to actuate said brake.

3. In a signalling device, the combination of: a pair of signals; a clutch actuating lever; a brake actuating lever; means associated with said clutch lever for operating one of said signals when said clutch lever is partially advanced, and for operating both of said signals when said clutch lever is fully advanced; and means associated with said brake lever for operating the other of said signals when said brake lever is partially advanced, and for operating both of said signals when said brake lever is fully advanced.

In testimony whereof I have hereunto set my hand at Los Angeles, California, this 13th day of May, 1921.

PETER McLAREN.